March 4, 1969  A. VARTANIAN ET AL  3,430,973
APPLIANCE DOLLY
Filed May 26, 1967
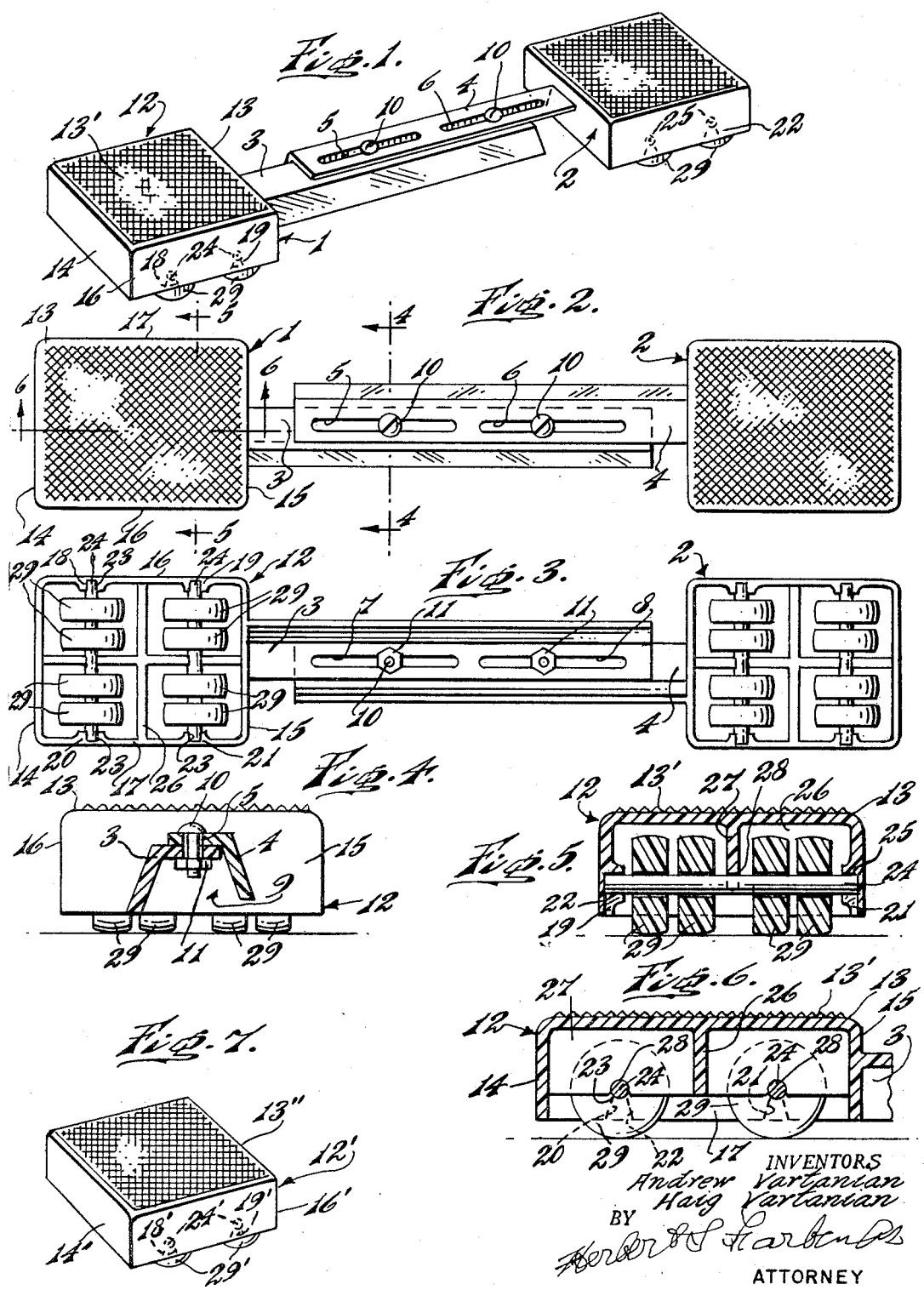
INVENTORS
Andrew Vartanian
Haig Vartanian
BY
ATTORNEY United States Patent Office 3,430,973
Patented Mar. 4, 1969

3,430,973
APPLIANCE DOLLY
Andrew Vartanian and Haig Vartanian, Philadelphia, Pa., assignors to Gem Marketing Corporation, Atlantic City, N.J., a corporation of New Jersey
Filed May 26, 1967, Ser. No. 641,611
U.S. Cl. 280—35                                             2 Claims
Int. Cl. B62d 21/14; B62b 1/04, 3/02

ABSTRACT OF THE DISCLOSURE

This invention relates to an appliance dolly which has been designed so that it will give maximum strength and efficiency and maximum economy in manufacture.

---

The dolly consists of a desired number of wheel housings, constructed of a plastic material, each housing having an angle bar integral with it and extending from it, the bar having a horizontal member provided with longitudinally spaced openings, adapted to receive a fastening device, so that the wheel housings may be spaced from each other in accordance with the size of a household appliance, such as a refrigerator, range, cabinet, or other heavy article.

A further purpose of the invention is to provide a novel construction of a wheel housing into which the assembled wheels can be mounted by forcing the axles of the wheels into cooperating open ended recesses in the housing.

The purpose of this invention is to form a plastic wheel housing and angle bar in one piece, so that when a pair are assembled together, the wheel housings are maintained in spaced relationship in accordance with the size of the article with which they are to be used, by a channel having an open bottom and formed by the angle bars.

A further objects is to form a wheel housing with a closed top and closed sides and an open bottom, with plastic wheels mounted on axles insertable in the bottom opening and having a slip fit connection with opposite side walls of the housing and with centrally disposed supporting ribs at right angles to each other.

With the foregoing and other objects in view as will hereinafter more clearly appear, our invention comprehends a novel construction and arrangement of an appliance dolly.

For the purpose of illustrating the invention, we have shown in the accompanying drawings, preferred embodiments of it, which we have found in practice to give satisfactory and reliable results. It is, however, to be understood that the various instrumentalities of which the invention consists can be variously arranged and organized, and the invention is not limited to the exact arrangement and organization of these instrumentalities as herein set forth.

FIGURE 1 is a perspective view of an appliance dolly of the present invention.

FIGURE 2 is a top plan view.

FIGURE 3 is a bottom plan view.

FIGURE 4 is a section on line 4—4, on an enlarged scale, taken on FIGURE 2.

FIGURE 5 is a section on line 5—5 of FIGURE 2.

FIGURE 6 is a section on line 6—6 of FIGURE 2.

FIGURE 7 is a perspective of another embodiment of the invention.

Similar numerals of reference indicate corresponding parts:

Referring to the drawings:

The dolly of the present invention consists of two wheel housings 1 and 2 of identical construction, connected in spaced relationship by angle bars 3 and 4, the sides of which are disposed at an angle, each bar being formed integral with a wheel housing, said bars being provided with slots 5, 6, 7 and 8, the bars when overlapping each other as best seen in FIGURES 1 to 4, forming a channel 9 and being locked in assembled condition with each other by fastening means such as bolts 10 and nuts 11. The wheel housings consists of a housing 12, having a closed top 13, provided with a roughened surface 13'; such as a knurled surface or may be molded integral with the housings, to prevent the article being carried from slipping, closed end walls 14 and 15 and closed side walls 16 and 17, with an open bottom, said side walls being provided with slots 18, 19, 20 and 21, spaced a suitable distance from the end walls, said slots tapering inwardly from the bottom as at 22 to a portion 23 of slightly less diameter than the axle 24, and terminating in an opening 25 to receive said axle 24 in frictional engagement therewith. Wheel receiving compartments are formed within the housing by reinforcing ribs at right angles to each other and consists of a transverse reinforcing rib 26 and a longitudinally extending rib 27, said ribs extending downwardly from within the housing so that the longitudinal rib will engage the axles in a suitable slot 28, as best seen in FIGURE 6. The axles 24 are provided with wheels 29, constructed of a suitable plastic and freely rotatable on said axles, the wheels being spaced in the above mentioned wheel receiving compartments, when the axles are snapped into place in their slots, as best seen in FIGURE 3.

In the embodiment seen in FIGURE 7, we have shown a wheel housing of similar construction as shown in the foregoing figures except that the connecting angles are eliminated and each housing acts as an individual unit, the numbers of the corresponding parts being primed.

In operation, the wheel housings are positioned a suitable distance apart to suit the article to be moved, the angle bars clamped in their adjusted position by their fastening means and the assembly is then slid under the article to be moved after the article is tilted a suitable distance to receive the assembly.

Tests run on one half of a dolly set by a standard testing laboratory has shown that a load of 500 pounds was easily supported and moved from one location to another.

Having thus described our invention, what we claim as new and desire to secure by Letters Patent is:

1. A dolly comprising a wheel housing of molded plastic having a closed top, closed sides and an open bottom, with internal ribs at right angles to each other terminating above the lower ends of the sides and forming wheel receiving compartments, a wheel assembly comprising axles with wheels free to revolve thereon, each compartment having a plurality of wheels, opposite sides of the housing having slots tapering inwardly from their bottom and terminating in axle receiving recesses, whereby the wheel assemblies have a snap fit mounting in opposite sides of the housing and are readily removable when desired for replacement or repairs, one of said ribs having downwardly facing slots, said downwardly facing slots receiving said axles and forming a central bearing for the axles.

2. The construction defined in claim 1, wherein an angle bar has one end integral with the housing and consists of a vertical side and a horizontal side, the latter having longitudinally spaced aperatures, whereby when two of such units are assembled with the angle bars overlapping, the housing of a pair can be spaced a desired distance from each other with openings in the horizontal sides in registering position and fastening devices in said registering openings to maintain the selected spacing of the housings from each other.

References Cited

UNITED STATES PATENTS 3,179,437  4/1965  Ensinger _____ 280—35
3,208,109  9/1965  Buck _____ 49—425

BENJAMIN HERSH, Primary Examiner.

R. R. SONG, Assistant Examiner.